(12) United States Patent
Pfeiffer et al.

(10) Patent No.: US 9,928,984 B2
(45) Date of Patent: Mar. 27, 2018

(54) GAS INLET FOR AN ION THRUSTER

(71) Applicant: AIRBUS DS GMBH, Taufkirchen (DE)

(72) Inventors: Bernd Pfeiffer, Moeckmuehl (DE); Reiner Teuchner, Schnaittach (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 15/581,710

(22) Filed: Apr. 28, 2017

(65) Prior Publication Data

US 2017/0316909 A1 Nov. 2, 2017

(30) Foreign Application Priority Data

Apr. 29, 2016 (DE) .................. 10 2016 207 370

(51) Int. Cl.
*H01J 27/02* (2006.01)
*F03H 1/00* (2006.01)
*H01J 9/34* (2006.01)

(52) U.S. Cl.
CPC .......... *H01J 27/022* (2013.01); *F03H 1/0037* (2013.01); *H01J 9/34* (2013.01)

(58) Field of Classification Search
CPC ........ H01J 27/022; H01J 9/34; H01J 37/3244; F03H 1/0037
See application file for complete search history.

(56) References Cited

U.S. PATENT DOCUMENTS

| 3,270,498 | A | 9/1966 | La Rocca |
| 3,445,616 | A | 5/1969 | Guyer |
| 6,136,278 | A | 10/2000 | Eliasson et al. |
| 2002/0080907 | A1 | 6/2002 | Rubbia |
| 2007/0023412 | A1* | 2/2007 | Wlodarczyk ........... F23Q 7/001 219/270 |
| 2010/0132802 | A1* | 6/2010 | Coventry ................ F17C 13/04 137/14 |

FOREIGN PATENT DOCUMENTS

| DE | 1270510 | 6/1968 |
| DE | 19739181 A1 | 3/1999 |
| DE | 102010060966 B3 | 4/2012 |

OTHER PUBLICATIONS

German Search Report for Application No. 102016207370 dated Jan. 26, 2017.

* cited by examiner

*Primary Examiner* — Joseph L Williams
*Assistant Examiner* — Jose M Diaz
(74) *Attorney, Agent, or Firm* — Jenkins, Wilson, Taylor & Hunt, P.A.

(57) ABSTRACT

A gas inlet suitable in particular for use in an ion thruster includes a housing which is made of a gas-tight ceramics material, and an insert which is arranged in the housing and is made of a porous ceramics material. The geometry and pore structure of the insert are such that the insert forms a desired flow resistance for a gas stream flowing through the insert.

15 Claims, 3 Drawing Sheets

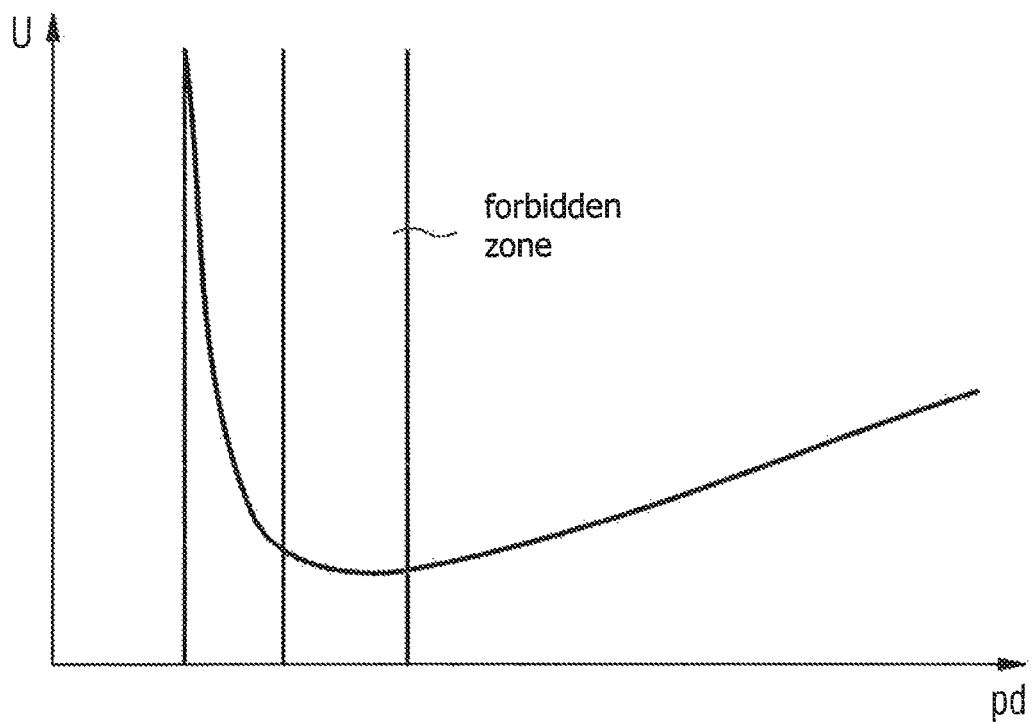

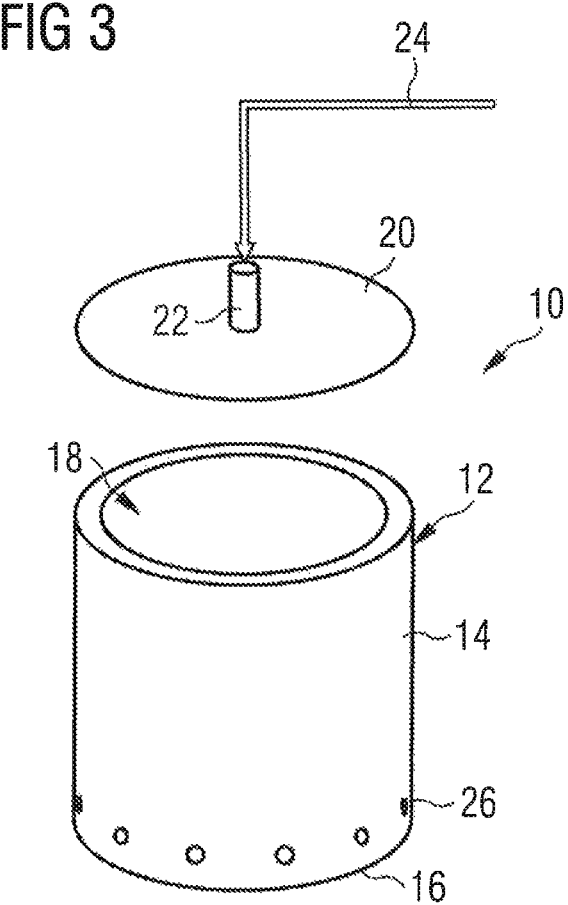

GAS INLET FOR AN ION THRUSTER

CROSS-REFERENCE TO RELATED APPLICATION

This application claims priority to German Patent Application DE 10 2016 207 370.2 filed Apr. 29, 2016, the entire disclosure of which is incorporated by reference herein.

TECHNICAL FIELD

The present disclosure relates to a gas inlet suitable for use in an ion thruster. The disclosure herein relates further to a method for producing such a gas inlet. Finally, the disclosure herein relates to an ion thruster equipped with such a gas inlet.

BACKGROUND

Ion thrusters used as propulsion for spacecraft generate thrust, and thus driving power, in that a fuel gas, such as, for example, xenon, is first ionized, and the gas particles are then accelerated in an electric field. In a neutralizer, the accelerated gas particles are electrically neutralized and finally ejected in the form of a jet at a speed of from 10 to 130 km/s. A gas inlet, via which the fuel gas, which flows through a fuel gas line connected to a fuel gas tank, is fed into the ion thruster, must ensure a defined inflow of the fuel gas into the thruster in order to allow the fuel gas to be distributed evenly in the thruster. Furthermore, the gas inlet must generate a defined flow resistance in order to ensure that plasma generated in the thruster does not flash over into the fuel gas line. This flow resistance should also remain as constant as possible in the case of a large number of thermal cycles to which the gas inlet is subjected in the course of its operating life.

Gas inlets currently fitted in ion thrusters comprise a plurality of components which are mounted in several steps. In a first step, a gas inlet housing is manufactured, into which a first sintered filter is then introduced. Glass beads or quartz sand particles having a diameter of less than 0.2 mm are then introduced into the gas inlet housing and compacted by a vibrating plate. The glass beads or quartz sand particles serve to establish the desired flow resistance of the gas inlet. A second sintered filter is then introduced. The sintered filters prevent the glass beads or quartz glass particles from falling out of the gas inlet housing. Finally, a cover is soldered to the gas inlet housing. The cover is provided with a gas inlet opening via which the fuel gas is fed into the gas inlet housing filled with glass beads or quartz sand particles.

SUMMARY

An object underlying the present disclosure is to provide a gas inlet which is suitable in particular for use in an ion thruster, which gas inlet can be produced simply and inexpensively and has a long service life under the operating conditions prevailing in an ion thruster. A further object underlying the disclosure herein is to provide a method for producing such a gas inlet. Finally, the disclosure herein is directed at the object of providing an ion thruster equipped with such a gas inlet.

The object is achieved by a gas inlet, a method and an ion thruster having features such as those disclosed herein.

A gas inlet suitable in particular for use in an ion thruster comprises a housing made of a gas-tight ceramics material. Manufacturing the housing from a gas-tight material ensures that gas fed into the housing cannot escape from the housing in an uncontrolled manner. The housing can have a hollow cylindrical shape, for example. In the region of a first end face, the housing can be provided with a base. In the region of a second end face opposite the first end face, on the other hand, the housing is preferably open. Arranged in the housing is an insert, preferably of one-piece construction, which is made of a porous ceramics material. The insert can have a cylindrical shape, for example, which is adapted to the shape of the housing. Since both the housing and the insert of the gas inlet are made of a ceramics material, the gas inlet is distinguished by high resistance at high temperatures. The geometry and pore structure of the insert are such that the insert forms a desired flow resistance for a gas stream flowing through the insert. Accordingly, the gas inlet requires only a single component, namely the insert, in order to generate a desired flow resistance for a gas stream guided through the gas inlet.

Compared to conventional arrangements, the gas inlet can accordingly be manufactured from significantly fewer individual parts. In particular, it is no longer necessary to use glass beads or quartz sand particles to establish a desired flow resistance for a gas stream flowing through the gas inlet. Instead, the flow resistance can be established very precisely in the gas inlet in a simple manner by the insert made of a porous ceramics material. The production of the gas inlet thereby requires fewer steps with shorter processing times, which results in lower production costs. A further advantage of the gas inlet is that, owing to the use of the insert made of a porous ceramics material having high temperature resistance, the gas inlet has a substantially constant flow resistance for a gas stream guided through the gas inlet even after a large number of thermal cycles. As a result, when the gas inlet is used in an ion thruster, it can reliably be ensured over the entire lifetime of the gas inlet that plasma generated in the ion thruster does not flash over into a fuel gas line connected to the gas inlet.

The pressure drop in the gas stream flowing through the insert, and thus the flow resistance for the gas stream flowing through the insert, depends on the geometry, in particular the thickness and cross-sectional area, of the insert and on the pore structure, in particular the porosity, the pore shape and the mean pore diameter, of the porous ceramics material used to produce the insert. Consequently, the thickness and cross-sectional area of the insert and also the porosity and mean pore diameter of the porous ceramics material used to produce the insert must be so chosen and adapted to one another that the desired pressure drop is established in the gas stream flowing through the insert. The thickness of the insert is preferably in the region of the thickness of conventional gas inlets with a glass bead filling. Accordingly, in particular the cross-sectional area of the insert as well as the porosity and mean pore diameter of the porous ceramics material used to produce the insert can be varied and adapted to one another in order to establish the pressure drop in the gas stream flowing through the insert, and thus the flow resistance for the gas stream flowing through the insert, as desired.

Preferably, the geometry and pore structure of the insert are such that the insert generates a flow resistance in the gas inlet that substantially corresponds to the flow resistance or is slightly greater than the flow resistance that is achieved in a conventional gas inlet by a most dense gas bead packing of approximately 74 vol. %. Consequently, the gas inlet can be manufactured with a similar geometry to conventional gas inlets. As a result, the gas inlet can be used in ion thrusters without adjustments having to be made to the geometry of the ion thrusters. The pore structure of the insert can optionally be so adapted that the insert, as compared with the most dense conventional glass bead packing, has a length through which flow is possible that is approximately 5 to 10% shorter, that is to say a dimension in a direction parallel to a flow direction of a gas through the gas inlet is approximately 5 to 10% shorter. The gas inlet can then be of particularly space-saving form.

For adapting the design parameters of the insert, Paschen's law can be used, which describes the dependency of the breakdown voltage in a homogeneous field on a product of gas pressure and electrode gap. In particular, the geometry and pore structure of the insert can be such that, at a given breakdown voltage, a product of a gas pressure of the gas stream flowing through the insert and an electrode gap, that is to say a wavelength of the gas stream through the insert, lies within a predetermined range. The given breakdown voltage is preferably chosen to be as great as possible.

In a preferred embodiment, the geometry and pore structure of the insert are such that, at a given breakdown voltage, the product of the gas pressure of the gas stream flowing through the insert and the electrode gap is either smaller than a lower threshold value or greater than an upper threshold value, that is to say a "forbidden zone" is defined in a curve graphically representing Paschen's law.

A range of the product of the gas pressure of the gas stream flowing through the insert and the electrode gap that lies, at a given breakdown voltage, between the lower threshold value and the upper threshold value is preferably a range which is suitable for permitting ignition of a fuel gas fed to the ion thruster by the gas inlet.

In a preferred embodiment of the gas inlet, the housing is made of an aluminum oxide material. In addition or alternatively, the insert can also be made of an aluminum oxide material. Aluminum oxide is distinguished by excellent thermal and mechanical properties. Alternatively, however, other ceramics materials can also be used to produce the housing and the insert. However, it is advantageous if the housing and the insert are made of materials which have substantially identical thermal expansion properties, because the gas inlet then reacts less sensitively to temperature fluctuations and has a longer lifetime in operation, when it is subjected to a large number of thermal cycles.

The housing can be made of AL300® from Wesgo Ceramic GmbH. This material contains 97.6% aluminum oxide.

The insert can be made of AL1009® from Wesgo Ceramic GmbH. This material contains 99.8% aluminum oxide. Alternatively, the insert can be made of the material aluminum-oxide-based HalFoam™ supplied by Morgan Advanced Materials.

If the insert is made of AL1009®, the porosity of the insert can be, for example, in a range of approximately from 10 to 30 vol. %, preferably in a range of approximately from 15 to 25 vol. % and particularly preferably in a range of approximately from 16 to 22 vol. %. By contrast, an insert manufactured from HalFoam™ can have a porosity of approximately from 70 to 90 vol. %, preferably of 77 vol. % at a mean pore size of 75 µm.

Preferably, the insert is seated in the housing without a gap. In particular, the insert can be seated in the housing in such a manner that an outer side of the insert, in particular in the region of a lateral surface of the insert, abuts an inner side of the housing. Furthermore, the insert is preferably so seated in the housing that the insert does not protrude beyond a housing edge in the region of an open second end face of the housing. As a result, the desired flow resistance of the gas inlet can be established particularly precisely.

In addition or alternatively, the insert is preferably seated in the housing without additional material, that is to say without using an additional adhesive or a glaze. This ensures that the flow resistance of the gas inlet remains the same over the entire lifetime, because outgassing of the adhesive, or penetration of the glaze into the porous insert, is not possible. As will be explained in greater detail hereinbelow, the seating of the insert in the housing without a gap and without additional material can be effected by jointly baking a suitably dimensioned housing green body made of a suitable material, for example AL300®, and a suitably dimensioned insert body made of a suitable material, for example AL1009® or aluminum-oxide-based HalFoam™.

The gas inlet preferably further comprises a housing cover which is provided with a gas inlet opening for feeding a fuel gas from a fuel line into the gas inlet. The housing cover can be made of a ceramics material or of metal. The housing cover is preferably fitted to the housing in the region of the open second end face of the housing and preferably rests without a gap on the insert arranged in the housing. Fuel gas fed via the gas inlet opening of the housing cover into the interior of the housing can then be guided directly into the porous insert.

The gas inlet can further be provided with at least one gas outlet opening for removing a fuel gas from the gas inlet. In a preferred embodiment of the gas inlet, the at least one gas outlet opening is formed in a lateral surface of the housing. Through the gas outlet opening, fuel gas which has been fed to the gas inlet via the gas inlet opening of the housing cover can be discharged in a defined manner from the gas inlet after it has flowed through the porous insert.

Preferably, the at least one gas outlet opening is arranged in the region of an edge of the housing opposite the housing cover. For example, the at least one gas outlet opening can be positioned in the lateral surface of the housing adjacent to the base of the housing. Such an arrangement of the gas outlet opening ensures that fuel gas fed via the gas inlet opening of the housing cover flows through the entire length of the porous insert through which flow is possible before the fuel gas leaves the gas inlet via the gas outlet opening.

In a particularly preferred variant of the gas inlet, a plurality of gas outlet openings is formed in the lateral surface of the housing in the region of an edge of the housing opposite the housing cover. The gas outlet openings can be distributed evenly in the peripheral direction of the lateral surface of the housing. Such an arrangement of the gas outlet openings allows the fuel gas to be fed particularly evenly into an ion thruster equipped with the gas inlet.

In a method for producing a gas inlet which is suitable in particular for use in an ion thruster, a housing green body is produced. An insert body is further produced. The insert body is inserted into the housing green body. Finally, the housing green body and the insert body are jointly baked, wherein the baking cycle is so chosen that the housing green body sinters to form a housing made of a gas-tight ceramics material, and an insert arranged in the housing and made of a porous ceramics material is produced from the insert body. After baking, the geometry and pore structure of the insert are such that the insert forms a desired flow resistance for a gas stream flowing through the insert.

Consequently, in the method for producing a gas inlet, only a joint baking step is required in order on the one hand to sinter the housing green body to form a gas-tight housing and on the other hand to produce an insert having a defined geometry and pore structure from the insert body.

In one embodiment of the method, the insert body is an insert green body which, when the housing green body and the insert body are jointly baked, sinters to form the insert arranged in the housing and made of a porous ceramics material. Depending on the materials used to produce the housing and the insert, the geometry and pore structure of the green bodies can be adapted accordingly in order to ensure that the housing green body is sintered by the baking operation to form a gas-tight housing, while the insert still has the desired defined geometry and pore structure even after baking. Likewise, the baking cycle, that is to say the baking temperature, the baking time, the rate of heating and any holding times at a specific holding temperature, can be varied in dependence on the materials used to produce the housing and the insert and also in dependence on the properties of the housing green body and of the insert body in the form of an insert green body, in order to ensure that the housing green body is sintered by the baking operation to form a gas-tight housing, while the insert still has the desired defined geometry and pore structure even after baking. The housing green body and the insert body in the form of an insert green body can experience different degrees of contraction during the joint baking operation.

The housing green body and/or the insert body in the form of an insert green body is/are preferably produced by cold isostatic pressing. By adapting the pressing power during cold isostatic pressing it is possible to influence the pore structure of the green bodies, and thus the contraction of the green bodies, as desired during baking. Further parameters which can be varied in order to adjust the contraction of the housing green body and/or of the insert body in the form of an insert green body include the specific surface area and thus sintering activity of the raw material (e.g. calcined clay), the calcination temperature, the grain size distribution of the raw material, the quantity and nature of the organic binders added to the raw material, the quantity and nature of the additives added to the raw material, such as, for example, $SiO_2$, MgO, CaO and further oxides, the grain size distribution of the spray granules produced from raw material, organic binders and additives, and the component size.

In an alternative embodiment of the method, the insert body is a pre-baked insert body whose geometry and pore structure remain substantially the same when the housing green body and the insert body are jointly baked. The use of a pre-baked insert body whose material properties remain substantially unchanged when the housing green body and the insert body are jointly baked has the advantage that only the contraction of the housing green body then has to be so controlled that the housing green body sinters to form the desired housing made of a gas-tight ceramics material. This facilitates the control of the process parameters and in particular the control of the baking cycle for the joint baking of the housing green body and of the insert body.

In a preferred embodiment of the method for producing a gas inlet, the housing green body is machined prior to baking. For example, at least one gas outlet opening for removing a fuel gas from the gas inlet can be introduced into the housing green body, in particular into a lateral surface of the housing green body. Machining of the housing green body can be carried out with simple tools and is therefore significantly less expensive compared with machining of the ceramics end product.

In addition or alternatively, the insert body can also be machined prior to baking. For example, the insert body can be machined prior to baking in order to adapt the shape of the insert body particularly precisely to the shape of the housing green body. It will be appreciated that machining of the insert body can be carried out particularly simply and inexpensively when the insert body is an insert green body.

The housing green body and the insert body are preferably baked at a temperature of 1700° C.

The housing is preferably produced from an aluminum oxide material, in particular AL300®. The insert is preferably produced from an aluminum oxide material, in particular AL1009® or aluminum-oxide-based HalFoam™. AL1009® is particularly suitable for the production of an insert which is manufactured from an insert body in the form of an insert green body and is sintered by being baked jointly with the housing green body to form an insert having the desired geometry and pore structure. By contrast, aluminum-oxide-based HalFoam™ can be used to produce an insert from a pre-baked insert body whose geometry and pore structure remain substantially the same when it is baked jointly with the housing green body.

Preferably, the insert is seated in the housing without a gap and/or without additional material as a result of the joint baking of the housing green body and of the insert green body.

In a preferred embodiment of the method for producing a gas inlet suitable in particular for use in an ion thruster, a housing cover which is provided with a gas inlet opening for feeding a fuel gas from a fuel line into the gas inlet is fitted to the housing with the insert arranged therein. In particular, the housing cover made of a ceramics material or of metal can be soldered to the housing in the region of an open end face of the housing.

An ion thruster comprises a gas inlet described above.

BRIEF DESCRIPTION OF THE DRAWINGS

A preferred embodiment of the disclosure herein will now be described in greater detail with reference to the accompanying diagrammatic drawing, in which:

FIG. 2 is a graphic representation of the relationship between a breakdown voltage U and a product of a gas pressure p of the gas stream flowing through the insert 18 and an electrode gap d; and FIG. 3 is a three-dimensional view of a gas inlet produced from the pre-product according to FIG. 1.

DETAILED DESCRIPTION

Figure 1:
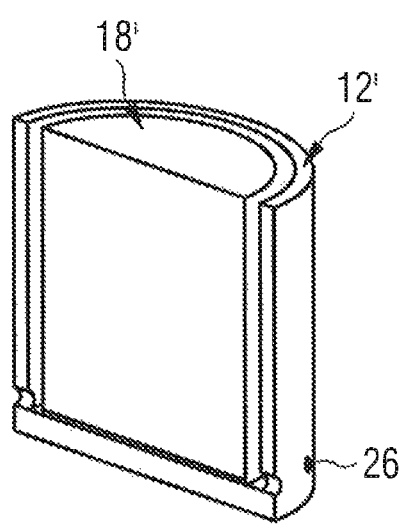
FIG. 1 is a cutaway three-dimensional view of a pre-product for the production of a gas inlet having an insert green body inserted into a housing green body.

A gas inlet 10 which is shown in FIG. 3 and is suitable for use in an ion thruster comprises a housing 12 made of a gas-tight ceramics material. In the arrangement according to FIG. 3, the housing 12 has a hollow cylindrical basic shape and has a circular cylindrical lateral surface 14. In the region of a first end face, the housing 12 is provided with a circular base 16. In the region of a second end face opposite the first end face, on the other hand, the housing 12 is open.

In the housing 12 there is arranged an insert 18, which is here of circular cylindrical shape, which is made of a porous ceramics material. In particular, the geometry and pore structure of the insert 18 are such that the insert 18 forms a desired flow resistance for a gas stream flowing through the insert 18. As can be seen in FIG. 3, the insert 18 is seated in the housing 12 without a gap, that is to say the insert 18 abuts an inner side of the housing 12 at least in the region of its lateral surface and also does not protrude beyond an edge of the housing 12 in the region of the open second end face of the housing 12. In addition, the insert 18 is seated in the housing 12 without additional materials, such as, for example, adhesives or glazes.

In the arrangement according to FIG. 3, the gas-tight housing 12 is made of an aluminum oxide material, for example AL300® from Wesgo Ceramics GmbH. The insert 18 is likewise made of an aluminum oxide material, but in this case from a porous aluminum oxide material. In particular, the insert 18 can be made of the material AL1009® from Wesgo Ceramics GmbH and can have a porosity of approximately from 16 to 22 vol. %. Alternatively, the insert can also be manufactured from the material aluminum-oxide-based HalFoam™ supplied by Morgan Advanced Materials. The insert 18 then has a porosity of approximately from 70 to 90 vol. %, preferably of 77 vol. % at a mean pore size of 75 μm.

Regardless of the material used to produce the insert 18, the design parameters of the insert 18 are adapted using Paschen's law, which describes the dependency of the breakdown voltage U in a homogeneous field on a product of gas pressure p and electrode gap d. A graphic representation of this relationship is illustrated in FIG. 2. In particular, the geometry and pore structure of the insert 18 are so chosen and adjusted that, at a given breakdown voltage U, a product of a gas pressure p of the gas stream flowing through the insert 18 and an electrode gap d, that is to say a wavelength of the gas stream through the insert 18, lies within a predetermined range.

The given breakdown voltage U is preferably chosen to be as great as possible. In particular, the geometry and pore structure of the insert 18 are such that, at a given breakdown voltage U, the product of the gas pressure p of the gas stream flowing through the insert 18 and the electrode gap d is either less than a lower threshold value S1 or greater than an upper threshold value S2, that is to say a "forbidden zone" is defined in the curve according to FIG. 2 graphically representing Paschen's law. The range of the product of the gas pressure p of the gas stream flowing through the insert 18 and the electrode gap d that lies, at a given breakdown voltage U, between the lower threshold value S1 and the upper threshold value S2 is preferably a range that is suitable for permitting ignition of a fuel gas fed to the ion thruster by the gas inlet 10.

The gas inlet further comprises a housing cover 20 which is provided with a gas inlet opening 22 for feeding a fuel gas from a fuel gas line 24, which is illustrated only diagrammatically, into the gas inlet 10. For the purposes of illustration, the housing cover 20 is not fitted to the housing 12 in FIG. 3. However, the housing cover 20 is provided to be fitted to the housing 12 in the region of the open second end face of the housing 12 and to lie without a gap on the insert 18 arranged in the housing 12. Fuel gas fed via the gas inlet opening 22 of the housing cover 20 into the interior of the housing 12 can then be guided directly into the porous insert 18.

The gas inlet 10 further comprises a plurality of gas outlet openings 26 which are arranged in each case in the lateral surface 14 of the housing 12. In particular, the gas outlet openings 26 are introduced into the lateral surface 14 of the housing 12 adjacent to the base 16 of the housing 12 and are distributed evenly in the peripheral direction of the lateral surface 14. Fuel gas fed from the fuel gas line 24 into the interior of the housing 12 can thus be distributed evenly in an ion thruster equipped with the gas inlet 10 via the gas outlet openings 26 after flowing through the porous insert 18.

In order to produce the gas inlet 10 shown in FIG. 3, a housing green body 12' illustrated in FIG. 1 is first produced.

An insert body 18' likewise shown in FIG. 1 is further produced. The housing green body 12' is produced by cold isostatic pressing of the raw material, that is to say AL300® in powder form.

The insert body 18' can be an insert green body. The insert body 18' in the form of an insert green body is then produced by cold isostatic pressing of the raw material AL1009® in powder form.

As required, the housing green body 12' and the insert body 18' can be machined. In particular, the gas outlet openings 26 are introduced into the housing green body 12'. The insert green body 18' is then inserted into the housing green body 12', whereby the pre-product shown in FIG. 1 is obtained.

Finally, the housing green body 12' and the insert green body 18' are jointly baked, wherein the baking cycle is so chosen that the housing green body 12' sinters to form a housing 12 made of a gas-tight ceramics material, whereas the insert green body 18' sinters to form an insert 18 arranged in the housing 12 and made of a porous ceramics material. In particular, the housing green body 12' and the insert green body 18' are baked at a temperature of 1700° C. After baking, the geometry and pore structure of the insert 18 are such that the insert 18 forms a desired flow resistance for a gas stream flowing through the insert 18.

Alternatively, the insert body 18' can be a pre-baked insert body 18' whose geometry and pore structure remain substantially the same when the housing green body 12' and the insert body 18' are jointly baked. To produce an insert 18 from a pre-baked insert body 18' whose geometry and pore structure remain substantially the same during joint baking with the housing green body 12', aluminum-oxide-based HalFoam™ can be used.

Finally, the housing cover 20 is fitted to the housing 12 with the insert 18 arranged therein. In particular, the housing cover 20 is soldered to the housing 12 in the region of the open second end face of the housing 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

the invention claimed is:

1. A gas inlet for use in an ion thruster, comprising:
   a housing made of a gas-tight ceramics material; and
   an insert which is arranged in the housing and made of a porous ceramics material, wherein a geometry and pore structure of the insert are configured such that the insert forms a desired flow resistance for a gas stream flowing through the insert.

2. The gas inlet as claimed in claim 1,
   wherein the geometry and pore structure of the insert are configured such that, at a given breakdown voltage, a product of a gas pressure of the gas stream flowing through the insert and an electrode gap lies within a predetermined range.

3. The gas inlet as claimed in claim 2,
wherein, at a given breakdown voltage, the product of the gas pressure of the gas stream flowing through the insert and the electrode gap is either less than a lower threshold value or greater than an upper threshold value.

4. The gas inlet as claimed in claim 3,
wherein a range of the product of the gas pressure of the gas stream flowing through the insert and the electrode gap that lies, at a given breakdown voltage, between the lower threshold value and the upper threshold value is a range that is suitable for permitting ignition of a fuel gas fed to the ion thruster by the gas inlet.

5. The gas inlet as claimed in claim 1,
wherein the housing is made of an aluminum oxide material and/or wherein the insert is made of an aluminum oxide material.

6. The gas inlet as claimed in claim 1,
wherein the insert is seated in the housing without a gap and/or without additional material.

7. The gas inlet as claimed in claim 1,
which further comprises:
a housing cover which is provided with a gas inlet opening for feeding a fuel gas from a fuel line into the gas inlet; and/or
at least one gas outlet opening for removing a fuel gas from the gas inlet, wherein the at least one gas outlet opening is preferably formed in a lateral surface of the housing and/or wherein the at least one gas outlet opening is arranged in the region of an edge of the housing opposite the housing cover.

8. A method for producing a gas inlet which is suitable in particular for use in an ion thruster, comprising:
producing a housing green body;
producing an insert body;
inserting the insert body into the housing green body; and
jointly baking the housing green body and the insert body, wherein the baking cycle is so chosen that the housing green body sinters to form a housing made of a gas-tight ceramics material, and that an insert arranged in the housing and made of a porous ceramics material is produced from the insert body, the geometry and pore structure of which insert, after baking, is such that the insert forms a desired flow resistance for a gas stream flowing through the insert.

9. The method as claimed in claim 8,
wherein the insert body is an insert green body which, when the housing green body and the insert body are jointly baked, sinters to form the insert arranged in the housing and made of a porous ceramics material, wherein the housing green body and/or the insert body in a form of an insert green body is/are produced by cold isostatic pressing.

10. The method as claimed in claim 8,
wherein the insert body is a pre-baked porous insert body whose pore structure remains substantially identical when the housing green body and the insert body are jointly baked.

11. The method as claimed in claim 8,
wherein the housing green body and/or the insert body is/are machined prior to baking, and/or wherein the housing green body and the insert body are baked at a temperature of approximately 1700° C.

12. The method as claimed in claim 8,
wherein the housing is produced from an aluminum oxide material and/or wherein the insert is produced from an aluminum oxide material.

13. The method as claimed in claim 8,
wherein the insert is seated in the housing without a gap and/or without additional material as a result of the joint baking of the housing green body and of the insert body.

14. The method as claimed in claim 8,
wherein a housing cover which is provided with at least one gas inlet opening for feeding a fuel gas from a fuel line into the gas inlet is further fitted, in particular soldered, to the housing with the insert arranged therein.

15. An ion thruster having a gas inlet for use in an ion thruster, the gas inlet comprising:
a housing made of a gas-tight ceramics material; and
an insert which is arranged in the housing and made of a porous ceramics material, wherein a geometry and pore structure of the insert are configured such that the insert forms a desired flow resistance for a gas stream flowing through the insert.

* * * * *